P. MOLAN.
Dinner-Pails.

No. 137,230. Patented March 25, 1873.

Witnesses
J. T. Brown
Eugene McEnroe

Inventor
Peter Molan

UNITED STATES PATENT OFFICE.

PETER MOLAN, OF NEW YORK, N. Y.

IMPROVEMENT IN DINNER-PAILS.

Specification forming part of Letters Patent No. 137,230, dated March 25, 1873.

*To all whom it may concern:*

Be it known that I, PETER MOLAN, of the city, county, and State of New York, have invented a certain Improved Dinner-Pail, of which the following is a specification:

The invention relates to dinner or lunch pail for the use of artisans, excursionists, and housekeepers or storekeepers, enabling them to carry and preserve articles of food, &c., either in a warm or cold state. In carrying out the invention I employ a sheet-metal pail of familiar construction, except that its side near the bottom is provided with a waste stop or spigot for the purpose of drawing off liquid from its interior. It is provided with a close-fitting cover and a bail or handle. Inside this pail is placed a metallic receptacle of a much less diameter, and provided with legs which sustain it above the bottom of the pail, and afford a space between the lower ends of the two. The bottom of the inner receptacle is extended so as to touch the inside of the outer one, and is perforated all around for a purpose that will be explained hereafter. Near its top there are also two or more ears or handles which also touch the inside of the outer case and keep the inner one centralized. This inner case is also provided with a close cover.

Figure 1:
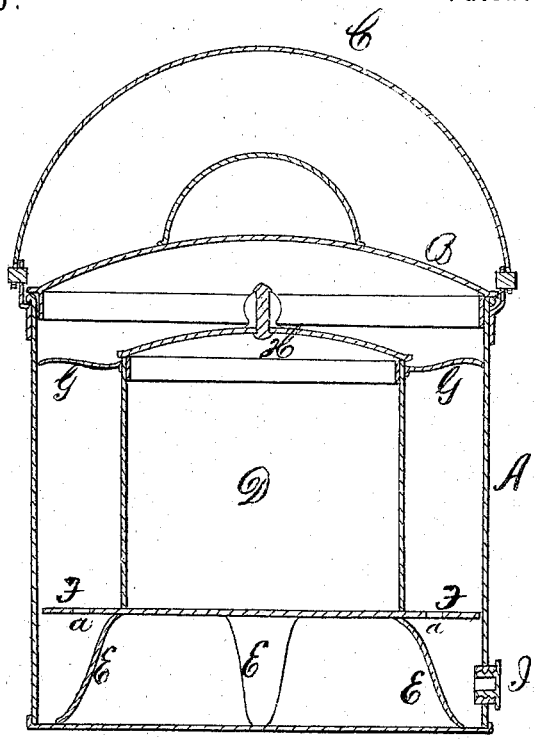
Figure 2:
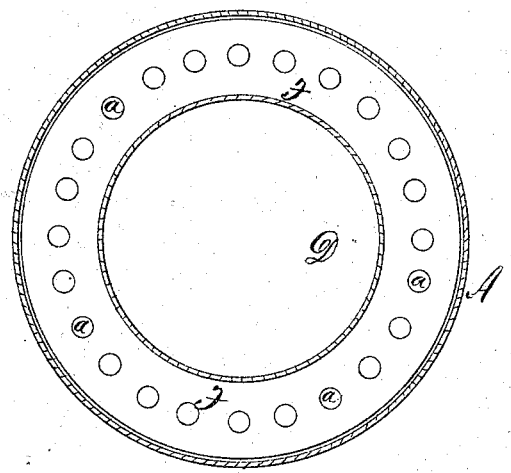

Figure 1 is a vertical section, and Fig. 2 is a horizontal section at about the middle of Fig. 1.

A represents the outer case, which is provided with a close-fitting cover, B, and a handle, C, by which it can be carried. Inside the case A is a receptacle, D, supported upon legs, E, so as to leave a clear space between the bottoms of the cases A and D, the latter of which is provided with an extension perforated in many places as at $a$, and made so as to touch the interior of the case A. It also has arms, $g$, near its top extending out the same distance as the bottom F, and serving in connection therewith to keep it centralized; and also, for the purpose of lifting it out, the extension is perforated to allow fluids to pass down into the space between the bottoms of the two cases. This inner case also has a close cover, H. An educt, I, is provided in the outer case to enable the liquids to be drawn off at pleasure. Solid or liquid food being placed in the inner case may be kept warm for a considerable length of time by hot coffee or any other liquid contained in the outer one, and should this latter become cold it may be readily reheated by being placed over a fire or on a stove, the bottom of the inner case being prevented from burning by being elevated by the legs E above the bottom of the outer case. The coffee or other fluid may be drawn off when so desired by the educt or spigot I. In cases where the device is to be used for carrying ice-cream, butter, lard, or other substances liable to be injuriously affected by heat, the space between the sides of the two cases will be packed with ice which will rest upon the extension F, the water which results from melting passing down through the perforations A, and being thereby kept from contact with the ice which it would otherwise induce to melt too fast.

I claim—

The inner casing or receptacle D, provided with the perforated extension F, the legs E, and arms G, in combination with the outer casing A, as described.

PETER MOLAN.

Witnesses:
 J. T. BROWN,
 EUGENE I. McENROE.